Figure 1:
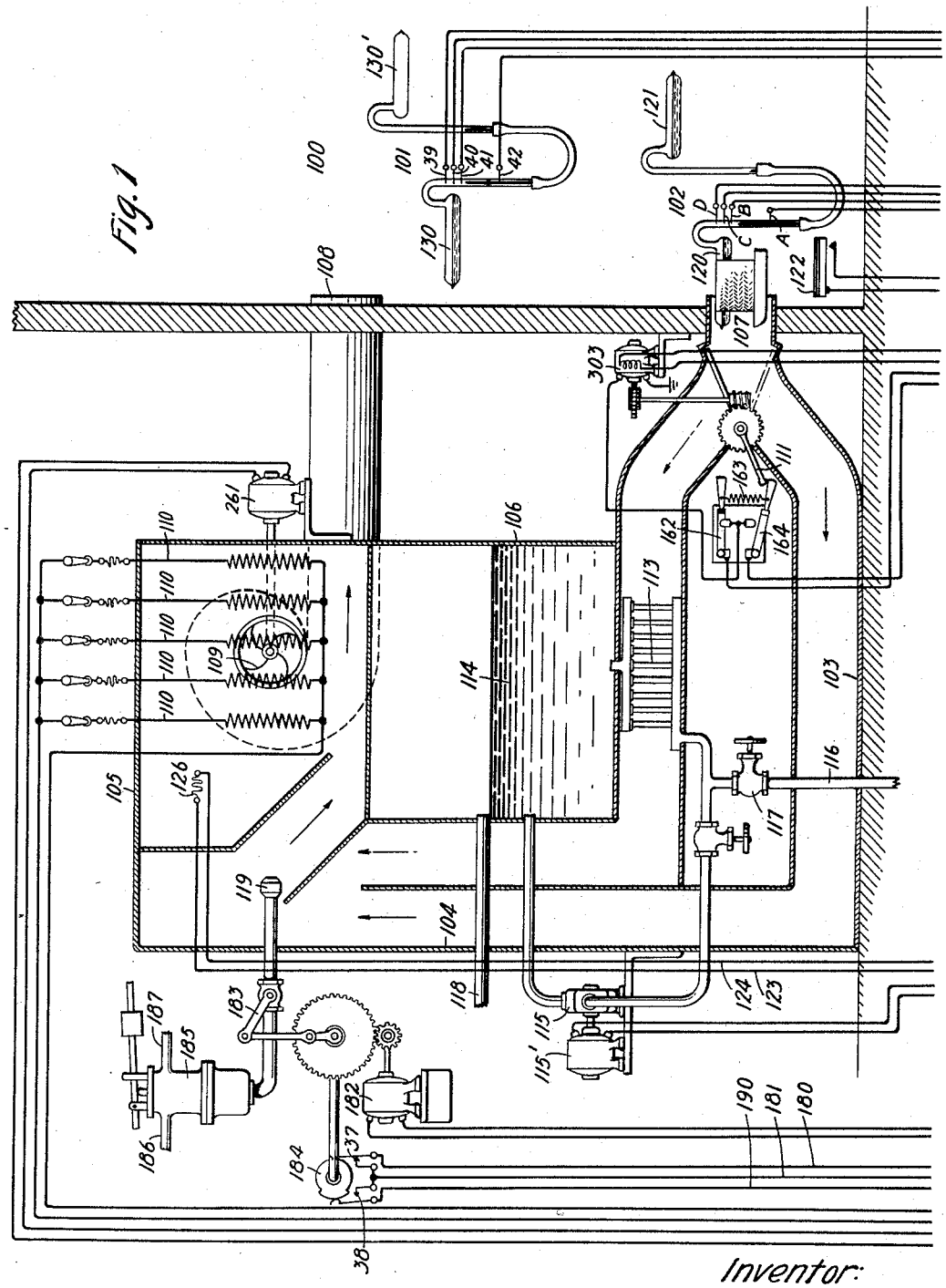

July 24, 1928.

J. H. BOWER 1,678,101

AIR CONDITIONING SYSTEM

Filed June 29, 1923

3 Sheets-Sheet 3

*Fig.3*

Inventor:
Justus H. Bower.
by Joel C. R. Palmer,
Att'y.

Patented July 24, 1928.

1,678,101

UNITED STATES PATENT OFFICE.

JUSTUS H. BOWER, OF RUTHERFORD, NEW JERSEY, ASSIGNOR TO WESTERN ELECTRIC COMPANY, INCORPORATED, OF NEW YORK, N. Y., A CORPORATION OF NEW YORK.

AIR-CONDITIONING SYSTEM.

Application filed June 29, 1923. Serial No. 648,464.

This invention relates to systems for controlling the temperature and humidity conditions of the air within an enclosure, and particularly to a system for maintaining the temperature and humidity at a desired value.

In systems which have previously been used for this purpose, air has been circulated from a room under control through conditioning apparatus and then redelivered to the room at the temperature and humidity which it is desired to maintain. With such systems it is necessary to circulate the air at quite high velocity in order that it will not remain in the room long enough for the heat or moisture losses or gains, which take place in the room, to produce an appreciable change in the condition of it. This requires a large expenditure of power to circulate the air at such a high velocity; and requires large capacity of the conditioning apparatus in order to handle such a large volume of air.

In such systems, the air has usually been conditioned by first cooling it to the saturation temperature corresponding to the conditions which it is desired to maintain in the room; then saturating the air at this temperature; and finally heating the air to the desired temperature, at which point it will have the desired relative humidity. Obviously, such procedure involves a large waste of power in cooling the air and then reheating it. Such waste is unnecessary except in cases where the humidity of the air drawn from the room must be lowered before delivering it to the room.

Among the objects of the invention are the provision of an economical flexible system for accurately maintaining the atmosphere within an enclosure at any desired condition of temperature and humidity within a wide range of values; and which is capable of simulating conditions of fog and precipitation.

Other objects of the invention are the provision of an air conditioning system which visually indicates the nature of the operation required of the apparatus to maintain a desired condition; and which protects against temperatures which are higher than are desired.

In accordance with the general features of the invention, air is drawn from a room under control; passed through conditioning apparatus; and returned to the room, under the control of means located within the room which are directly responsive to the temperature and humidity conditions in the room. The air conditioning apparatus so conditions the air passing through it that upon the redelivering of the air it tends to compensate for any variations which have taken place in the room from the desired temperature and humidity conditions. The air delivered to the room is in general not at the condition which is desired to maintain in the room, but is in such a condition that upon mixing with the air in the room, the mixture will be at the desired condition. Hence, it is only necessary to circulate the air through the conditioning apparatus at a comparatively slow rate, thus economizing in power required to effect the circulation, and also economizing in the capacity of the conditioning apparatus required.

In the conditioning chamber there are provided an electric heater, a cooling surface, and a water spray, all under control of means responsive to the air conditions in the room being controlled. These units are only in operation when actually required, the spray being operated only when humidification is required, the cooling means being operated only when cooling or dehumidification is required, and the heater being operated only when heating is required.

Figure 2:
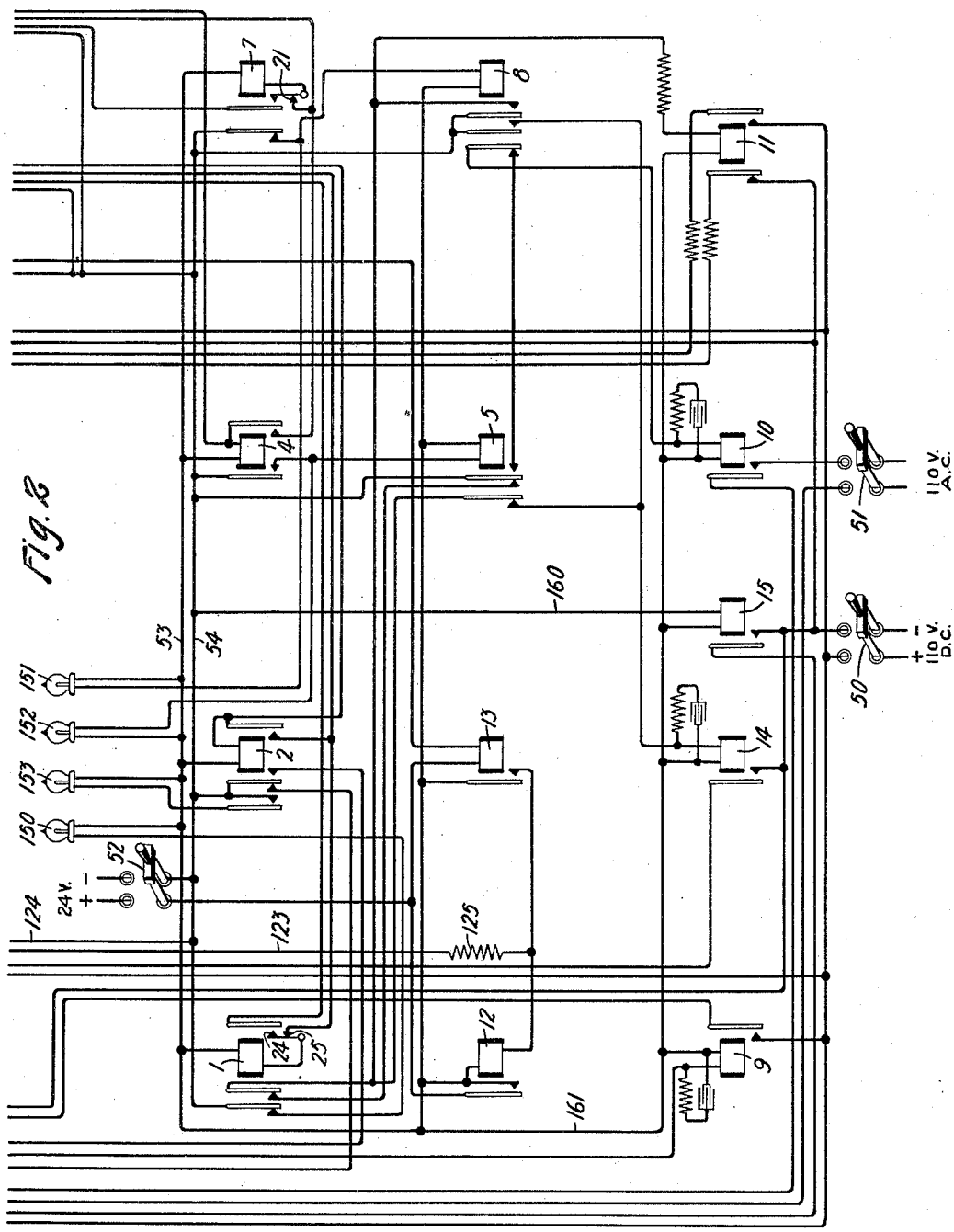

Figs. 1 and 2 of the drawings, when placed together with the right hand edge of Fig. 1 matched with the left hand edge of Fig. 2, shows diagrammatically the mechanical and electrical arrangement of an apparatus constructed in accordance with this invention. Figs. 1 and 3 when placed together with the right hand edge of Fig. 1 matched with the left hand edge of Fig. 3, illustrate diagrammatically the mechanical and electrical arrangement of an alternative form of this invention.

Referring to Figs. 1 and 2, there is shown a room 100 in which are positioned a thermostat 101 and a humidostat 102 that are responsive to the condition of the air within the room and control the apparatus for conditioning the air, in a manner which will be described in detail later. Adjoining the room is a conditioning chamber comprising walls 103, 104, 105 and 106, and having an inlet 107 and an outlet 108 connected with room 100. Air is slowly drawn from room 100 through inlet 107, then through the conditioning chamber and redelivered to the room through 108 by means of a blower 109. If the temperature within the room is below the value which the apparatus is set to maintain, damper 111 will be in the position shown in solid lines and the air circulated through the conditioning chamber will be heated by electric coils 110, which will then be in operation. If the temperature of the air in the room is above the desired value, damper 111 will be in the position shown in dotted lines, and the air circulated through the conditioning chamber will pass over the cooling means 113, thus being cooled before it is delivered to the room. In this case heating coils 110 will not be in operation. The surface of 113 may be maintained cold by any suitable means such as water circulated through its interior from tank 114 by a circulating pump 115. The water within tank 114 may be kept at a low temperature by any suitable means such as cakes of ice placed within the tank. An inlet pipe 116 may be connected to the municipal water supply and, if desired and conditions permit, the cooling surface 113 may be kept cold by opening valve 117 and permitting water from the municipal supply to pass through the interior of the cooling device 113 to tank 114 and out through overflow pipe 118.

If the humidity in room 100 is too low, spray 119 will be in operation and the air on passing through the conditioning chamber will be humidified. If the humidity is too high, damper 111 will, in general, be in the position shown by the dotted lines and the air will pass over the cooling device 113, thus condensing out moisture and drying the air. In this case, spray 119 will not be in operation.

Humidostat 102 comprises wet bulb 120 and dry bulb 121 which contain a quantity of a suitable volatile liquid such as ethyl chloride. These two bulbs are joined by a U-tube containing mercury, which is adapted to complete circuits between contacts A, B, C and D. This humidostat is of the construction described in the copending application to Rolfe A. Folsom, Serial No. 430,425, filed December 13, 1920. Thermostat 101 is similar in construction to the humidostat except that both bulbs are dry and only one contains the volatile liquid, the other containing a suitable gas such as air.

The system is set in operation by closing switches 50, 51 and 52; switches 50 and 51 supplying power at a suitable voltage such as 110 volts for energizing the heating coils and operating the control motors, and switch 52 supplying power at a suitable voltage such as 24 volts for operating indicating lamps and relays which control the operation of the apparatus. The switches having been closed, relay 12 is operated by hand, and becomes locked through a circuit which will be pointed out presently. This makes connection from the positive side of the line to conductor 53 which then becomes in effect, a positive bus. Conductor 54 is connected through the switch directly to the negative side of the 24 volt line and thus in effect is a negative bus.

Within room 100 there is provided a safety thermostat 122 which is normally open, but is arranged to close if the temperature within the room becomes so high as to be excessive. If this thermostat closes, relay 13 is energized, thus shunting the current from relay 12 and allowing it to return to the non-operated position. This breaks the connection to positive bus 53 and suspends the operation of the apparatus. Assuming safety thermostat 122 to be open, relay 12 after being operated by hand is locked by means of the circuit through conductors 123 and 124 connected to resistance coil 125 and a fusible link 126. Link 126 is composed of any suitable fuse alloy and is positioned adjacent to heating coils 110. Should the temperature of the chamber containing the heating coils become excessive, the link will melt, breaking the locking circuit to relay 12 and suspending the operation of the entire apparatus. It is thus seen that there two safety devices, one located in room 100 and the other located adjacent to heating coils 110, and each is adapted to become operated upon the attainment of an excessive temperature in its locality, to suspend the operation of the entire apparatus.

As is well understood in the art, a change in the temperature of air without any addition or extraction of moisture changes the relative humidity, and thus the humidity and temperature regulation must, to a certain extent, be interdependent. In the system of the present invention, regulation for temperature takes precedence over regulation for humidity, but in many cases, regulation for temperature will in itself tend to accomplish any necessary change in relative humidity, and in any event there will not be any undue delay in bringing the condition of the room to the desired value of both temperature and relative humidity.

In order to make clear the manner in which thermostat 101 and humidostat 102 control the apparatus in the conditioning chamber, it will be assumed that initially the air in the room has a humidity and a temperature much higher than the value which the apparatus is set to maintain. The temperature being considerably too high, the pressure in bulb 130 of the thermostat will be so much higher than the pressure in bulb 130' that the mercury in the U-tube will be in some such position as shown. Due to the humidity being considerably too high, the temperature of bulb 120 will be higher than otherwise and the vapor pressure of the volatile liquid contained in the bulb 120 will be so related to the pressure in bulb 121 that the mercury in the U-tube of the humidostat will be in some such position as is shown. Supposing that the mercury in the humidostat remains in the position shown, the operation of the apparatus will be traced for a variation in conditions which would result in the mercury column of the thermostat rising gradually to terminal 39 and the returning gradually to the position shown in the drawing. Under normal operating conditions, such a change would probably not take place without movement of the humidostat mercury column, but the consideration of such a cycle will be convenient to illustrate the operation of the apparatus.

The thermostat and humidostat being in the position illustrated, a circuit is completed from the positive bus through the "dehumidify" lamp 150, through the outer left hand contact of relay 1 to the negative bus, thus lighting the lamp 150, which indicates that dehumidification is required. Likewise, a circuit is completed from the positive bus through the cooling lamp 151, through the outer contact of relay 7, to the negative bus, thereby indicating that cooling is required. A circuit is also completed from the positive bus over conductor 161 to blower relay 15, and over conductor 160 to the negative bus, thus bringing the blower relay 15 into the operated position and causing the operation of motor 261 which drives the blower 109. From the negative bus a circuit is completed by way of the outer contact of relay 7 through the winding of relay 8, to the positive bus, thus bringing relay 8 into the operated position and completing a circuit from the negative bus to the inner contact of relay 8, thence to damper relay 11 and back to the positive bus. The operation of damper relay 11 causes current to pass from the positive side of the 110 volt D. C. line, through the right hand contact of relay 11, through switch blade 162, through the armature of motor 303 to ground. The field of motor 303 is continuously energized by being connected in bridge of the 110 volt D. C. line, and hence the motor is set in operation and shifts the damper from the position shown in full lines to that shown in dotted lines. As the damper moves, spring 163 effects the closure of knife switch 164 and as the damper moves into the position shown in the dotted lines, knife switch 162 is opened, breaking the circuit to the armature of motor 303. The making of the center contact of relay 8 completes a circuit to the winding of pump relay 14, thereby bringing it into the operated position and causing pump 115 to be set in operation by motor 115' to cool surface 113. In this condition, the air which is circulated through the conditioning chamber passes over cooling surface 113, thereby lowering the temperature of room 100.

When the mercury in the thermostat rises so as to make contact with terminal 41, connection is completed from the negative bus to the inner armature of relay 7 but no change in the apparatus takes place.

Upon a further rise of the mercury in the thermostat to terminal 40, a circuit is completed from the negative bus through terminal 40 and contact 21 of relay 7 through relay 7 to the positive bus, bringing the relay into operated position. The relay locks in the operated position through its inner armature and thermostat terminal 41, contact 21 being broken as the relay becomes fully operated. The breaking of the outer contact of relay 7 shuts off the "cool" lamp 151 and releases relay 8. Upon the release of relay 8, the circuit to relay 11 through the inner contact of relay 8 is broken. However, relay 11 does not release because of the circuit from the negative bus through the inner back contact of relay 5, to the inner left hand contact of relay 1, to relay 11 and back to the positive bus; which holds the relay in the operated position. Likewise pump relay 14 is not released on account of the circuit from the negative bus to the inner armature of relay 5, to the inner left hand contact and armature of relay 1, through the winding of pump relay 14 to the positive bus. In this condition the "dehumidify" lamp 150 is lighted and the air continues to pass over cooling surface 113 which extracts moisture from the circulated air.

As the mercury in the thermostat rises so as to make contact with terminal 39, a circuit is completed from the negative bus through the winding of relay 4 to the positive bus, thereby bringing relay 4 into the operated position. This relay becomes locked in the operated position through its right hand armature and terminal 40 of the thermostat, and hence will not release until the mercury has dropped below terminal 40. Through the left hand contact of relay 4 a circuit is completed from the negative bus through the winding of relay 5 to the positive bus, bringing relay 5 into the operated position. The breaking of the inner back contact of relay 5 opens the circuit from the negative bus to the inner contact of relay 1, through the winding of damper relay 11 and back to the positive bus. This causes the release of relay 11, and the making of the left hand back contact of relay 11 causes current to pass from the negative side of the 110 volt D. C. line, through switch blade 164, through the armature of motor 103 to ground thus setting the motor in operation in the reverse direction and causing it to shift the damper to the position shown in solid lines. Each side of the 110 volt D. C. line is 55 volts away from ground potential. The breaking of the outer back contact of relay 5, opens the circuit to the winding of pump relay 14 by way of the inner left hand contact of relay 1 and the outer back contact of relay 5, thus causing the release of the pump relay 14 and suspending the operation of circulating pump 115. The heater relay 10 is brought into the operated position by current through a circuit from the negative bus, to the inner front contact of relay 5, to the outer contact of relay 8, to the winding of relay 10, and back to the positive bus. This sets heating coils 110 in operation. Through the left hand armature of relay 4 the "heat" lamp 152 becomes operated showing that heating of the air is required. The "dehumidify" lamp 150 remains in operation through the circuit comprising the outer left hand contact of relay 1, thus showing that dehumidification is also required. It should be noted, however, that although the extraction of moisture by radiator 113 has been suspended, the relative humidity will continue to be lowered by reason of the fact that the air is being heated.

The foregoing is an instance of temperature control taking precedence over humidity control. In the condition of the apparatus which is represented by the mercury in the thermostat being below contact 41 and the mercury in the humidostat being below contact B the room is calling for a decrease in humidity and a decrease in temperature. As long as the temperature did not decrease below the predetermined low limit, the damper relay was maintained operated by way of a circuit through the inner back contact of relay 1 and the inner back contact of relay 5, thus causing the damper to be in the position shown in dotted lines, and the air to be passed over the cooling surface. This caused extraction of moisture from the air due to the condensation on cooling surface 113 and also caused cooling of the air. When the temperature of the air reached the predetermined low limit, extraction of moisture was suspended. This condition will continue until the temperature of the air has been sufficiently raised, when extraction of moisture will be resumed if necessary.

Assume that the mercury column of the thermostat drops so as to break contact with terminal 39 but remains in contact with terminals 40 and 41. This breaks the connection from the negative side of the bus through terminal 39 to the winding of relay 4 but relay 4 remains in the operated position on account of being locked through a circuit comprising its right hand contact and terminal 40 of the thermostat.

The "dehumidify" and "heat" lamps remain lighted, heating continuing and reduction in relative humidity being accomplished by virtue of the rise in temperature of the air.

Assume the mercury column of the thermostat to drop below terminal 40; this breaks the locking circuit of relay 4 through its right hand armature, allowing the relay to return to the non-operated position. The release of its left hand armature breaks the circuit to the "heat" lamp, thus extinguishing it; and also breaks the circuit through the winding of relay 5. The release of relay 5 completes a circuit from the negative bus through the inner back contact of relay 5 through the inner left hand contact of relay 1, through the outer back contact of relay 5, through the winding of the pump relay 14 to the positive bus, bringing the pump relay into the operated position and setting the pump in operation. The release of relay 5 also opens the circuit from the negative bus through the inner front contact of relay 5 through the outer back contact of relay 8 to the winding of heater relay 10, to the positive bus, thus allowing the heater relay to return to the non-operated position and suspending the operation of heaters 110. The making of the inner back contact of relay 5 completes the circuit from the negative bus through the inner left hand contact of relay 1 through the winding of damper relay 11 to the positive bus, bringing the damper relay into the operated position. This causes current to flow from the positive side of the 110 volt D. C. line through the right hand contact of relay 11 through knife switch 162 and the armature of motor 103 to ground, thus setting the motor in operation and causing it to shift the damper to the position shown in dotted lines. It is seen that as soon as the temperature of the room has risen to the predetermined value, the heaters are turned off; but the humidostat has throughout been assumed to remain in the position where dehumidification is required, and hence as soon as the temperature condition of the room will permit, damper 111 is shifted to the position shown in the dotted lines and the circulating air is passed over the radiator 113 thereby causing extraction of moisture from the air. In this condition, the temperature of the room is at the proper value and lamps 151, 152 and 153 are extinguished, lamp 150 being in operation to show that dehumidification is required.

A further drop of the mercury column of the thermostat breaks the circuit through terminal 41, thereby opening the locking circuit of relay 7 and allowing the relay to return to the non-operated position. The making of outer back contact of relay 7 lights the "cool" lamp 151, thereby showing that cooling of room 100 is required. The circuit is also completed from the negative bus through the outer left hand contact of relay 7, through the winding of relay 8 to the positive bus, thus bringing relay 8 into the operated position. The making of the middle contact of relay 8 completes connection from the negative bus to the pump relay. The making of the inner contact of relay 8 makes connection from the negative bus to the damper relay. However, in this instance, these two connections are superfluous since the pump relay 14 and the damper relay 11 were already in the operated position by means of circuits comprising the left hand back contacts of the relay 1 and the back contacts of relay 5. This leaves the "dehumidify" lamp 150 and the "cool" lamp 151 burning, thus showing that dehumidification and cooling are required. Cooling and extraction of moisture from the air simultaneously take place by the passage of the air over cooling surface 113. This is the same condition in which the apparatus was placed by throwing on switches 50, 51 and 52 and operating relay 12 at the beginning of the explanation, the thermostat and humidostat being in the position which was then assumed.

It will now be assumed that the condition of the air in room 100 changes in such a manner that the mercury column of humidostat 102 rises to contact D and then returns to the position shown in the drawing. As has been pointed out, the process of humidification and dehumidification must at times give way to heating and cooling and throughout the following explanation, it will not be assumed that the thermostat remains in the position shown, but in each instance in which heating or cooling conflicts with the process of humidification or dehumidification the fact will be pointed out.

On the rising of the mercury in the humidostat 102 so that it makes contact with terminal B, connection is made from the negative bus to the right hand armature of relay 1, but no change takes place and hence cooling and extraction of moisture from the air continues to take place.

When the mercury of the humidostat 102 makes contact with terminal C, a circuit is completed from the negative bus through terminal C, through contact 25 of relay 1, and through the relay winding to the positive bus, thereby bringing the relay into the operated position. The relay locks in the operated position through a circuit from the positive bus, through the relay winding to relay contact 24, to terminal B of the humidostat and back to the negative bus; and hence relay 1 will not release until the mercury falls below terminal B. The breaking of the outer left hand contact of relay 1 extinguishes the "dehumidify" lamp 150. The breaking of the inner left hand contact breaks the circuit from the negative bus, through the inner back contact of relay 5, through the inner left hand contact of relay 1 to the outer left hand contact of relay 5, to the pump relay 14, thereby causing the release of the pump relay and suspending the operation of motor 115′ that drives pump 115. The operation of relay 1 also breaks the circuit from the negative bus through the inner back contact of relay 5, to the inner left hand contact of relay 1, thence to the winding of damper relay 11 and back to the positive bus. It is seen that the operation of the left hand contacts of relay 1 opens circuits to the pump relay 14 and the damper relay 11; and hence these relays will be allowed to return to the non-operated position thereby suspending the operation of the pump and turning the damper to the position shown in solid lines, provided this procedure does not conflict with the temperature requirements of the room.

However, if the temperature of the room is so high that the mercury of thermostat 101 is in the position shown, it will be seen that there is a circuit from the negative bus through the outer left hand contact of relay 7 through the winding of relay 8 to the positive bus so that relay 8 will be in the operated position; and middle contact of relay 8 will complete a circuit from the negative bus through the winding of pump relay 14, thus causing the pump to remain in operation. Likewise a circuit will be completed from the negative bus through the inner contact of relay 8 through the winding of damper relay 11, and hence the damper will remain in the position shown in dotted lines and cooling will continue. Also, the "cool" lamp will be lighted through a circuit comprising the left hand contact of relay 7.

If, however, the temperature conditions are not in conflict with the requirements for humidity, the operation of relay 1 will cause the suspension of the operation of the pump and the damper will be placed in the position shown in full lines; and moisture will neither be added to or extracted from the air. If the temperature conditions are correct, relay 7 will be in the operated position through the circuit from the positive bus through either terminals 40 or 41 of the thermostat; and thus the "cool" lamp which is controlled by the left hand back contact of relay 7 will be extinguished. In this condition, the humidity and temperature are both correct, and hence none of the indicating lamps are lighted. Neither the pump, spray or heaters are in operation and the apparatus is said to be in a float condition. No expenditure of power is taking place except the small amount required to energize the field of motor 303, and to drive blower 109 which is of relatively small capacity and causes a temporarily idle circulation of air from room 100 through the air conditioning chamber.

Suppose the mercury in the humidostat rises so as to make contact with terminal D. A circuit is completed from the negative bus through terminal D, through the winding of relay 2 to the positive bus, thereby bringing the relay into the operated position and causing it to lock through its right hand contact and terminal C. The making of the outer left hand contact of relay 2 causes the lighting of "humidify" lamp 153, thereby showing that humidification is required. The making of the inner front contact of relay 2 causes a circuit to be completed from the negative bus over conductor 180, contacts 37, conductor 181, through the winding of spray relay 9, to the positive bus. This brings relay 9 into the operated position and causes power to be delivered from the 110 volt D. C. line to motor 182, which causes the movement of valve 183 until cam 184 is rotated through 180 degrees so as to separate contacts 37, thereby causing the release of spray relay 9 and suspending the operation of the motor. This movement of valve 183 turns it so as to allow water under pressure to pass from mixer 185 to spray 119. Mixer 185 may be of any suitable commercial type in which cold water is delivered to the mixer through pipe 186 and hot water delivered through pipe 187, and the mixer so combines them as to deliver water at a definite desired temperature to spray nozzle 119.

The spray discharges water directly into the path of the air being circulated through the conditioning chamber and hence it will return to room 100 at increased humidity. This in no way interferes with the operation of heaters 110 or cooling device 113, and hence either of these may be operated under the control of thermostat 101 to effect the correction of the temperature of room 100 while spray 119 is in operation to increase the humidity.

When the humidity in room 100 has been sufficiently increased, the mercury column of the humidostat 102 will descend so as to break contact with terminal D. This breaks the connection from the mercury column to the winding of relay 2 by way of terminal D, but does not effect the release of the relay on account of the fact that it is locked through its right hand armature and terminal C of the humidostat. Hence humidity lamp 153 remains burning and humidification continues, any correction in temperature being carried on independently, under the control of the thermostat.

Upon still further increase in the humidity, the mercury column of the humidostat drops below the contact C thereby breaking the locking circuit to relay 2 and causing its release. The breaking of the outer left hand contact extinguishes the "humidify" lamp; and the making of the inner back contact completes a circuit from the negative bus over conductor 190, through contacts 38, over conductor 181, and through the winding of spray relay 9 to the positive bus, thereby bringing the spray relay into the operated position. The operation of the spray relay causes power to be supplied from the 110 volt D. C. source to motor 182, thereby causing a further 180 degree rotation of cam 184, and a movement of valve 183 such that the water supply to nozzle 119 is shut off. The apparatus is now in a float condition as far as humidity is concerned, and any correction for temperature will be accomplished independently of the humidity control portion of the apparatus under control of thermostat 101.

Suppose the mercury column of humidostat 102 drops below contact B. This breaks the locking circuit of relay 1 through relay contact 24 and humidostat terminal B thus allowing relay 1 to return to the non-operated position. The making of the outer left hand contact of relay 1 causes the "dehumidify" lamp 150 to be put in operation. Also as has previously been seen, the release of relay 1 completes a circuit to the pump relay from the negative bus to the inner back contact of relay 5, to the inner left hand contact of relay 1 and the outer left hand contact of relay 5, provided relay 5 is in the non-operated position. If the temperature conditions of room 100 do not require the temperature to be raised, relay 5 will be in the non-operated position and the pump will be set in operation. Otherwise the circuit to the pump relay will be interrupted by the outer contact of relay 5 and the pump will not be set in operation. Likewise, as has previously been seen, the inner left hand contact of relay 1 completes the circuit to the damper relay 11 by way of the inner back contact of relay 5, and hence the damper relay will be operated and the damper set to pass air over the cooling surface, provided this is not in conflict with the temperature requirements. If it is in conflict with the temperature requirements, the circuit to the damper relay is interrupted by the inner back contact of relay 5 and no change in the position of the damper takes place.

It is seen from the foregoing description that a system has been provided in which the air conditions of a room are controlled by means responsive to the temperature and humidity in the room to regulate the temperature and humidity to a desired value. The various pieces of apparatus required to effect corrections of the condition of the atmosphere are in operation only when actually required and there is no waste, due to cooling a large volume of air and immediately reheating it to substantially its original temperature.

A detailed description will now be given of the alternative arrangement of the system which is shown diagrammatically when the left hand edge of Fig. 3 is matched with the right hand edge of Fig. 1.

With this arrangement, the vapor thermostat 101 is eliminated from the system and a double contact bi-metal thermostat 200 of any suitable and well-known construction is used in its stead. The arrangement of all power circuits is the same as in the system just described and also the arrangement of relays 1, 2, 12 and 13, and humidostat 102 is the same. The only changes which are introduced into the circuit are those necessary to the substitution of the bi-metal thermostat 200 for the vapor thermostat 101, and hence a detailed description will only be given of the operation of that portion of the circuit which is controlled by the thermostat.

Suppose that the temperature within room 100 is at the value which the apparatus is set to maintain and that the humidity is such that the humidostat 102 is in the position shown on the drawing. To set the system in operation, power switches 50, 51 and 52 are thrown and relay 12 operated by hand as in the previously described system. With this arrangement, conductor 54 becomes a negative bus and conductor 53, a positive bus and the humidity being high, "dehumidify" lamp 150 immediately lights. A circuit is completed from the negative bus through the left hand back contact of relay 4' through the winding of relay 7', thus bringing relay 7' into the operated position. Bringing relay 7' into the operated position completes the circuit through the winding of relay 8' by way of the outer front contact of relay 7', thus bringing relay 8' into the operated position. By the operation of relay 8', a circuit is completed from the negative bus through the center contact of relay 8' to the pump relay 14, thus bringing the pump relay into the operated position and setting the pump in operation. Likewise the circuit is completed from the negative bus through the inner front contact of relay 8' to damper relay 11 thus bringing the damper relay into the operated position and causing current to be delivered to the armature of the damper motor from the positive side of the 110 volt D. C. line. This causes the motor to turn in the proper direction to shift the damper to the position shown by dotted lines. In this condition, the circulating air is passed over the cooling surface 113 and by means of the outer front contact of relay 7' the "cool" lamp 151 is set in operation thus indicating that cooling is taking place.

As the cooling continues the movable element of the bi-metal thermostat 200 will move in the direction of terminal 35 and will finally make contact with it. Upon the making of contact with terminal 35, a circuit will be completed from the negative bus, through terminal 35, through the winding of relay 4' to the positive bus, thus bringing relay 4' into the operated position. This breaks the back contact of relay 4', thus allowing relay 7' to drop back to the non-operated position, which in turn allows relay 8' to return to the non-operated position, which in turn allows pump relay 14 and damper relay 11 to return to the non-operated position. Thus the pump is shut off and the making of the left hand back contact of relay 11 causes current to be delivered to the armature of the damper motor from the negative side of the 110 volt D. C. line, thus causing the damper to be moved to the position shown in full lines. The making of the front contact of relay 4' completes the circuit to the winding of relay 5' thereby bringing that relay into operation and through the front contact of relay 5' and the outer back contact of relay 8', a circuit is completed through the winding of heater relay 10, thus bringing the heater relay into the operated position and causing heating coils 110 to be energized. In this condition, the circulating air is being heated and through the front contact of relay 4' the "heat" lamp 152 is set in operation, the "cool" lamp 151 having been extinguished by the return of relay 7' to the non-operated position.

As heating continues, the movable elements of the thermostat will move away from terminal 35 but upon breaking contact with 35 no change in the arrangement of the relays takes place since relay 4' is locked in the operated position through contact 21' of relay 7'.

As heating continues, the movable element of the thermostat will eventually make contact with terminal 36 which will complete the circuit from the negative bus through the winding of relay 7' to the positive bus, thus bringing relay 7' into the operated position.

The inner armature of relay 7' breaks contact 21' thus allowing the release of relay 4' which in turn releases relay 5' and extinguishes the "heat" lamp 152. The breaking of the front contact of relay 5' opens the circuit through the winding of heater relay 10, thus causing the power to be shut off from heating coils 110. Concurrent with the operation of relay 7', relay 8' is brought into the operated position by means of the circuit completed to its winding through the outer front contact of relay 7'. The center and inside armatures of relay 8' complete circuits to the pump relay 14 and the damper relay 11, respectively, thus setting the pump in operation and causing the damper to be positioned as indicated by dotted lines. In this condition, the "cool" lamp is in operation and cooling takes place.

As the cooling continues, movable elements of the thermostat will move so as to break contact with terminal 36, but nothing will happen until it makes contact with terminals 35, thus causing relay 4' to be brought into the operated position and breaking the locking circuit to relay 7' through the back contact of relay 4'.

It is seen that with the bi-metal thermostat, the circulating air will be alternately heated and cooled depending upon the temperature of the air within the room 100 and hence the temperature of the air will be kept within two predetermined limits. However, either heating or cooling is always taking place since no float condition for temperature is provided, as is the case in the system employing the vapor thermostat 101.

The control for humidity takes place in the same manner as in the system which was first described, the control for temperature taking precedence during intervals in which there is conflict between the two controls. However, it is seen that the air is alternately heated and cooled over a very small range of temperature, and hence in any event, correction for humidity will only be held briefly in abeyance on account of conflict between humidity and temperature control.

Rooms such as 100, are used, among other purposes, for making tests of electrical apparatus, the deterioration and operation of which vary with the atmospheric conditions. In some instances it is desirable to place apparatus in a room such as 100 and maintain the temperature and humidity conditions constant over a long period of time in order to note the effect upon the apparatus. However, it frequently becomes necessary to change the adjustment of the apparatus in order that it will regulate for a new temperature or a new humidity, or both, and it may be desirable to do this in a manner which will accomplish any atmospheric condition desired.

In cases in which it is desired to raise the operating temperature without causing any condensation on the apparatus, it can be done by gradually raising bulb 130' of the thermostat until the apparatus regulates for the desired new value of temperature. If bulb 130' is raised gradually, the temperature change will take place gradually, and hence there will be no condensation on apparatus under test due to warm moist air coming in contact with apparatus at a lowered temperature. However, in some cases, it is desired to obtain condensation on the apparatus in which case, bulb 130' of the thermostat may be raised quickly and the spray may be put in operation, by quickly raising bulb 121 of the humidostat, in which case warm moist air will be delivered to room 100 and coming in contact with apparatus under test, which is at a temperature below the dew point, condensation will take place.

For some tests it is also desirable to simulate the condition of fog. This can be accomplished by operating room 100 at a high temperature and humidity and then quickly altering the thermostat so that cold air will be delivered to the room. The cold air will chill the warm, moist air of the room below the dew point, thus causing fog, and if the cooling is sufficient, precipitation may be accomplished.

Applicant is aware that air conditioning systems have been provided in which the air from an enclosure under control is circulated through a conditioning chamber where it is heated and humidified as circumstances require in order to maintain the humidity and the temperature of the air within the enclosure above a predetermined value. However, as far as applicant is aware, such systems have not been capable of regulating the temperature and humidity of the air within predetermined limits; and have not been provided with means to dehumidify and cool the air in case the weather conditions are such that the air within the enclosure tends to remain at too high a humidity or at too high a temperature, or both.

The invention claimed is:

1. In combination, an air filled enclosure, means for withdrawing air from said enclosure and redelivering it to the enclosure; means for heating and means for cooling the withdrawn air, means responsive to the temperature conditions in said enclosure and relays responsive to said means for controlling the operation of said heating and said cooling means.

2. A system for regulating the temperature of the air within an enclosure comprising, an air conditioning chamber, means for circulating air from said enclosure through said chamber, means for heating the air as it passes through said chamber, means for cooling the air as it passes through said chamber, and means responsive to the temperature in said enclosure to set in operation said cooling means when the temperature in said enclosure is above a predetermined value and to set in operation said heating means when the temperature in said enclosure is below a predetermined value.

3. A system for regulating the temperature of the air within an enclosure comprising, an air conditioning chamber, means for circulating air from said enclosure through said conditioning chamber, means for cooling the air as it passes through said chamber, and means responsive to the temperature in said enclosure to set in operation said cooling means when the temperature in said enclosure rises above a predetermined value.

4. A system for regulating the temperature of the air within an enclosure comprising; an air conditioning chamber, means for circulating air from said enclosure through said conditioning chamber, means for cooling the air as it passes through said chamber, and means responsive to the temperature within said enclosure to cause the operation of a visual signal, external to said enclosure, when the temperature within said enclosure increases above a predetermined value.

5. A system for regulating the temperature of the air within an enclosure comprising an air conditioning chamber, means for circulating air from said enclosure through said conditioning chamber, means for heating the air as it passes through said chamber, and means responsive to the temperature in said chamber to cause the operation of a visual signal, external to said enclosure, when the temperature within said enclosure decreases below a predetermined value.

6. A system for regulating the temperature of the air within an enclosure comprising an air conditioning chamber, means to circulate air from the enclosure through said air conditioning chamber, means for heating the air as it passes through said chamber, means responsive to the temperature in said enclosure to set in operation said heating means when the temperature in said enclosure decreases below a predetermined value, means to suspend the operation of said heating means when the temperature in said enclosure rises to a predetermined value, and separate safety means responsive to the temperature in said enclosure to terminate the operation of the system when the temperature in said enclosures rises to a predetermined value.

7. A system for regulating the temperature of the air within an enclosure comprising an air conditioning chamber, means to circulate air from the enclosure through said air conditioning chamber, means for heating the air as it passes through said chamber, means responsive to the temperature in said enclosure to set in operation said heating means when the temperature in said enclosure decreases below a predetermined value, means to suspend the operation of said heating means when the temperature in said enclosure rises to a predetermined value, and separate safety means responsive to the temperature adjacent said heating means to terminate the operation of the system when said temperature adjacent the heating means rises to a predetermined value.

8. A system for regulating the temperature of the air within an enclosure comprising an air conditioning chamber, means to circulate air from the enclosure through said air conditioning chamber, means for heating the air as it passes through said chamber, and safety means responsive to the temperature adjacent said heating means to suspend the operation of the heating means when said temperature adjacent the heating means rises to a predetermined value.

In witness whereof, I hereunto subscribe my name this 27th day of June, A. D. 1923.

JUSTUS H. BOWER.